Nov. 23, 1926.  1,608,058

C. A. CLEMONS

WHEEL REMOVER

Filed April 19, 1924

Inventor

C.A.Clemons,

By
Attorney

Patented Nov. 23, 1926.

1,608,058

UNITED STATES PATENT OFFICE.

CASH A. CLEMONS, OF BELLEVILLE, ILLINOIS.

WHEEL REMOVER.

Application filed April 19, 1924. Serial No. 707,662.

This invention relates to wheel pullers adapted to be used for removing the rear wheel of an automobile machine from the axle thereof and it consists in the novel features hereinafter described and claimed.

An object of the invention is to provide a device of the character stated which is of simple and durable structure and which may be easily and quickly applied to the axle from which the wheel is to be removed. When so applied the device is struck with a hammer, the blow being delivered in the direction of the length of the axle whereby the axle and the key thereof are loosened in the hub of the wheel and the wheel may be quickly detached from the axle.

The device consists of a body member having hexagonally arranged exterior faces to which a wrench may be applied in a usual manner for screwing the said body member upon the threaded end portion of the axle. The said body member is provided at its opposite ends with internally threaded sockets which are alined with each other. Each socket is diametrically enlarged at its inner end portion and beyond the inner end of the thread thereof. The sockets are of different diameters.

Plugs are provided with threaded shanks which are adapted to be screwed into the sockets and when applied the inner ends of the plugs bear squarely against the inner or bottom walls of the sockets. Each plug is provided at its outer end with a head portion which transversely is of the same shape and dimensions as the transverse shape and dimensions of the body member. The head portions of the plugs are spaced from the threaded shank portions thereof by diametrically reduced neck portions which are disposed beyond the ends of the body member when the plugs are inserted in the sockets and the inner ends of the plugs are in contact with the inner or bottom walls of the sockets.

When in use for loosening or removing a wheel from the axle upon which it is keyed, one of the plugs is removed from one of the sockets of the body member and the socket thus vacated is screwed upon the threaded end of the axle so that the end of the axle bears against the inner or bottom wall of the said socket. The operator then uses a hammer upon the outer plug, striking the same a blow in the direction of the length of the axle whereby the axle is loosened in the hub of the wheel and the said wheel may be readily removed from the axle.

In the accompanying drawing—

Figure 1:
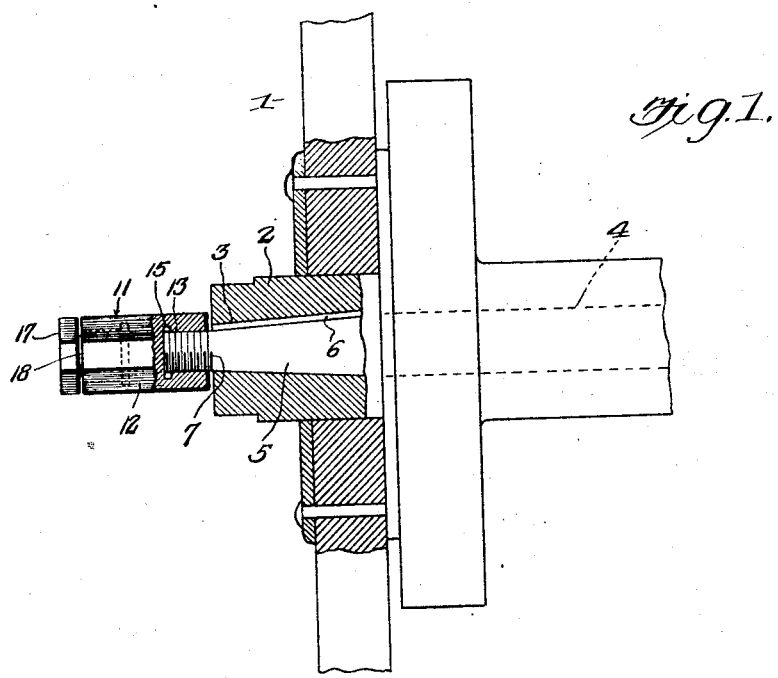
Figure 1 is a transverse sectional view of a wheel showing the axle in elevation and with the wheel puller applied to the axle.
Figure 2:
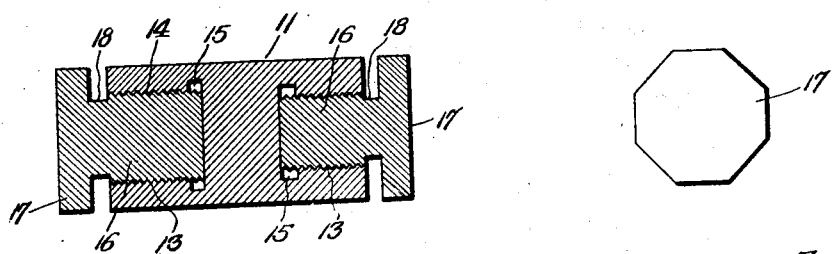
Figure 2 is an enlarged longitudinal sectional view of the device.
Figure 3:
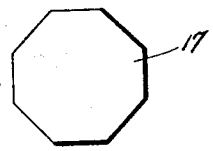
Figure 3 is an end view of the plug.

The rear wheel of an automobile machine is shown at 1. The said wheel is provided with a usual hub 2 having a key groove 3. The axle 4 is provided in the vicinity of its end with a cone-shaped section 5 adapted to fit snugly in the hub of the wheel and a key 6 is mounted upon said section 5 and is adapted to fit in the key groove of the hub of the wheel. The extremity of the axle is threaded as at 7.

The device comprises a body member 11 having hexagonally arranged exterior faces 12. The body is provided at its opposite ends with alined sockets 13 which are of different diameters. Each socket is provided with an internally threaded outer portion 14 and an inner diametrically enlarged portion 15 located beyond the inner end of the thread and which is provided with smooth walls.

Plugs are adapted to fit in the sockets and completely fill the threaded portions thereof. Each plug is provided with a threaded shank 16 which is of a length equal to the length or depth of the socket in which it fits so that when the plug is inserted in the socket its inner end bears squarely against the inner or end wall of the socket. Each plug is provided at its outer end with a head portion 17 which is transversely of the same shape and dimensions as the transverse shape and dimensions of the body member. The head portion 17 is spaced from the threaded shank of the plug by a reduced neck portion 18. When the shank is inserted in the socket of the body member the diametrically reduced neck portion lies beyond the end of the said body member.

The device is used in the following manner. The hub cap is removed from the hub of the wheel. The cotter pin and nut are removed from the axle. One of the plugs is removed from one of the sockets of the body member of the device and the said vacated socket is screwed upon the end of the axle until the end of the axle bears squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.